United States Patent
Gorce (10) Patent No.: US 10,960,852 B2
(45) Date of Patent: Mar. 30, 2021

(54) WIPER SYSTEM FOR AUTOMOTIVE VEHICLE

(71) Applicant: Valeo Systèmes d'Essuyage, Le Mesnil Saint Denis (FR)

(72) Inventor: Stéphane Gorce, Skawina (PL)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 196 days.

(21) Appl. No.: 16/026,511

(22) Filed: Jul. 3, 2018

(65) Prior Publication Data
US 2019/0009749 A1   Jan. 10, 2019

(30) Foreign Application Priority Data

Jul. 6, 2017   (FR) ...................................... 1756391

(51) Int. Cl.
*B60S 1/34* (2006.01)
*B60S 1/20* (2006.01)
(Continued)

(52) U.S. Cl.
CPC ........... *B60S 1/3404* (2013.01); *B60S 1/0814* (2013.01); *B60S 1/20* (2013.01); *B60S 1/28* (2013.01); *B60S 2001/3825* (2013.01)

(58) Field of Classification Search
CPC .. B60S 1/3404; B60S 1/28; B60S 1/20; B60S 1/0814; B60S 2001/3825
(Continued)

(56) References Cited

U.S. PATENT DOCUMENTS

| | | | | | |
|---|---|---|---|---|---|
| 1,777,541 | A | * | 10/1930 | Anderson | B60S 1/18 |
| | | | | | 15/250.26 |
| 1,859,641 | A | * | 5/1932 | Weaver | B60S 1/3404 |
| | | | | | 15/250.19 |

(Continued)

FOREIGN PATENT DOCUMENTS

| | | |
|---|---|---|
| EP | 3037307 A1 | 6/2016 |
| FR | 2827241 A1 | 1/2003 |

(Continued)

OTHER PUBLICATIONS

Preliminary Search Report and Written Opinion issued in corresponding French Application No. 1756391, dated Mar. 5, 2018 (7 pages).

*Primary Examiner* — Gary K. Graham
(74) *Attorney, Agent, or Firm* — Osha Bergman Watanabe & Burton LLP (57) ABSTRACT

A wiping system for a motor vehicle having a blade configured to move in linear translation over a window and in a direction parallel to two opposite sides of this window, is disclosed. The wiping system also includes a first rail and a second rail which are arranged at the sides of the window, the rails having a curvature to espouse the shape of the window and for housing a first runner and a second runner which are respectively connected to first and second ends of the blade, and a first drive motor and a second drive motor arranged respectively at the first rail and at the second rail to drive the first and second runner via a first coupling mechanism and second coupling mechanism, the first and second drive motors being operated by a control unit configured to synchronize movements of the first and second runners.

8 Claims, 3 Drawing Sheets

(51) Int. Cl.
*B60S 1/08* (2006.01)
*B60S 1/28* (2006.01)
*B60S 1/38* (2006.01)

(58) Field of Classification Search
USPC ....... 15/250.25, 250.29, 250.24, 250.11, 103
See application file for complete search history.

(56) References Cited

U.S. PATENT DOCUMENTS

| | | | | | |
|---|---|---|---|---|---|
| 2,063,055 | A | * | 12/1936 | Shaw .................. | B60S 1/08 15/250.19 |
| 2,112,197 | A | * | 3/1938 | Horton ................ | B60S 1/18 15/250.24 |
| 2,393,605 | A | * | 1/1946 | Bramhall ............. | B60S 1/18 15/250.26 |
| 2,829,394 | A | * | 4/1958 | Brigmon .............. | B60S 1/38 15/250.23 |
| 2,984,855 | A | * | 5/1961 | Murray ................ | B60S 1/10 15/250.29 |
| 3,686,706 | A | * | 8/1972 | Finley ................. | B60S 1/18 15/250.16 |
| 3,837,032 | A | * | 9/1974 | Ulbrich ............... | B60S 1/08 15/250.17 |
| 6,092,259 | A | | 7/2000 | Reppert | |
| 6,446,301 | B1 | * | 9/2002 | Kemp .................. | B60S 1/30 15/250.24 |
| 6,986,186 | B1 | * | 1/2006 | Dube ................... | A47L 1/02 15/250.01 |

FOREIGN PATENT DOCUMENTS

FR           2832968 A1    6/2003
WO          92/05054     *    4/1992

* cited by examiner

WIPER SYSTEM FOR AUTOMOTIVE VEHICLE

The present invention relates to the field of motor vehicle window wiping and, more particularly, to a linear wiping system, which means to say one in which the blade moves over the window that is to be wiped in a linear translational movement.

A wiping system generally comprises at least one blade, possibly fixed to an arm, moved in a pivoting movement by a motor so as to move back and forth between first extreme position and a second extreme position in order to sweep across, and therefore wipe, at least part of the window of the motor vehicle.

At the present time, with the objective of reducing the energy consumption of motor vehicles, a great deal of work is being conducted into improving the aerodynamics of motor vehicles in order to improve their air penetration coefficient. One line of improvement involves modifying the curvature of the front windscreen of the motor vehicle, notably by increasing the radius of curvature thereof. With such windscreens, the traditional pivoting wiping systems are unable to ensure correct wiping of such windows. Hence the development of linear wiping systems.

A liner wiping system having a rail positioned at the top of a window and allowing a mobile element supporting a wiper arm to which a wiper blade is fixed to move inside it is known from the prior art.

However, the wiper blade has a free end. This free end may, notably at high speed, fail to follow the end connected to the arm and the quality of the wiping may not be guaranteed. Furthermore, the presence of the free end may weaken the blade which can bend, or even break, in the event of high crosswinds. In addition, with such an arrangement, the mobile element may become damaged and notably deformed because of the degrees of freedom that the free end still enjoys. Moreover, it is possible that such a wiper blade may not exhibit sufficient flexibility because of the rigidity imposed by the wiper arm, thus preventing the wiper blade from espousing the curvature of the window that is to wiped.

Furthermore, linear wiping systems having a wiper blade, each end of which is connected to one side of the window that is to be wiped are also known from the prior art. This wiping system has a motor arranged on one side of the window that is to be wiped so as to drive a mobile element allowing the wiper blade to be moved over the window that is to be wiped.

However, it is possible that the sides of the window that is to be wiped may not have the same length and the distance of travel of the ends of the blades between the first and second wiping positions may differ. Thus, the wiping of the window may prove insufficient with such a wiping system, and zones situated near the end of travel of the ends of the blades may fail to be wiped correctly, thus potentially detracting from visibility and therefore driving safety.

It is an objective of the present invention to at least partially mitigate the effects of the shortcomings of the prior art listed hereinabove.

It is another objective of the present invention, which differs from the above objective, to propose a linear wiping system that allows the entirety of the window that is to be wiped to be wiped correctly.

It is another objective of the present invention to propose a wiping system that allows correct wiping of the window that is to be wiped, whatever the curvature of this window.

In order to achieve at least one of the aforementioned objectives, one subject of the present invention is a wiping system, notably for a motor vehicle, comprising at least one blade configured to move in linear translation over a window and in a direction parallel to two opposite sides of this window, the said at least one blade having a first end and a second end, characterized in that the wiping system further comprises at least a first rail and a second rail which are arranged at the sides of the window, the said at least first rail and second rail respectively having a curvature intended to espouse the shape of the window and being intended to house a first runner and a second runner which are respectively connected to the first and to the second ends of the blade, and in that the wiping system further comprises at least one first drive motor and one second drive motor arranged respectively at the first rail and at the second rail in order respectively to drive the first runner and the second runner via a first associated coupling mechanism and second associated coupling mechanism, the said at least first drive motor and second drive motor being operated by a control unit configured to allow the movements of the first runner and of the second runner to be synchronized.

The presence of the first rail and of the second rail means that the blade can be pressed firmly against the window that is to be wiped. Moreover, the shape of these rails espouses the shape of the window that is to be wiped, and this allows the blade to be in permanent contact with the window and guarantees correct wiping of the various zones thereof whatever the curvature of this window. In addition, use of the first drive motor and of the second drive motor makes it possible to ensure correct linear translation of the blade over the window because the first runner and the second runner move in a synchronized manner inside the rails, thereby allowing the wiping of the zones arranged at the end of blade travel.

The wiping system according to the present invention may comprise one or more of the following features considered alone or in combination.

The first end of the blade has a spring intended to provide the connection between the first end of the blade and the first runner arranged in the at least one first rail.

The second end of the blade has a specific shape of attachment, notably spherical or parallelepipedal, intended to collaborate with the second runner arranged in the at least one second rail.

According to one alternative form, the second end of the blade may have a spring intended to provide the connection between the second end of the blade and the second runner arranged in the at least one second rail.

The first runner and the second runner have a first end housed in the rail and a second end exhibiting a clip intended to allow the said runner to collaborate with the first or the second end of the blade.

The first end of the runner has wheels to allow it to move along inside the rail.

According to one particular embodiment, the clip of the second runner has a shape that complements the specific shape of attachment borne by the second end of the blade.

According to one aspect, the first rail and the second rail have an interior surface made from a material that has a coefficient of friction of less than 0.25.

The material used for the interior surface of the first rail and of the second rail is chosen from copper, tin, bronze, polytetrafluoroethylene, a polyamide, graphite, nylon, an acetal, or a mixture of these compounds.

According to another aspect, the interior surface of the first rail and of the second rail is configured to allow the first runner and the second runner to move along on an air cushion.

According to a first alternative form, the first drive motor and the second drive motor are configured to move the first runner and the second runner respectively at the same speed.

According to a second alternative form, the first drive motor and the second drive motor are configured to move the first runner and the second runner at different speeds so as to mitigate the effects of differences in length of the two opposite sides of the window.

The first drive motor and the second drive motor are configured to move the blade at a speed of at most 2 m/s over the surface of the window that it to be wiped.

According to one aspect, the first associated coupling mechanism and the second associated coupling mechanism are chosen from a belt-and-pulley system, a cable-and-pulley system, or alternatively a rack-and-pulley system.

According to this aspect, the first rail and the second rail each have at least one end opening, the said end openings having a shape configured to limit the impairment of the first associated coupling mechanism and second associated coupling mechanism, notably a rounded or chamfered shape.

According to one particular embodiment, the wiping system comprises:
- the first drive motor and the second drive motor which are arranged respectively at the centre of the first rail and of the second rail,
- a first blade and a second blade, the first blade being positioned on a first side of the window and the second blade being positioned on a second side of the window, opposite to the first side with respect to the first drive motor and second drive motor,
- the first associated coupling mechanism and the second associated coupling mechanism, comprising:
  - a first four-groove pulley and a second four-groove pulley, positioned at the centre of the first rail and second rail and moved in terms of rotation by the first drive motor and second drive motor respectively,
  - two first two-groove pulleys and two second two-groove pulleys positioned respectively at the ends of the first rail and second rail, and
  - four cables respectively connecting the first two-groove pulleys to the first four-groove pulley and the second two-groove pulleys to the second four-groove pulley, the said cables each supporting at least one runner and being configured to allow this at least one runner to be moved between the two-groove pulley and the four-groove pulley which are connected via the said cable so as to allow the first or the second blade to be moved over the window that is to be wiped.

Further features and advantages of the present invention will become more clearly apparent from reading the following description, given by way of nonlimiting illustration, and from the attached drawings in which.

In these figures, elements that are identical bear the same numerical references.

The following embodiments are examples. Although the description refers to one or more embodiments, that does not necessarily mean that each reference relates to the same embodiment, or that the features apply only to one single embodiment. Simple features from various embodiments can also be combined or interchanged to form other embodiments.

In the following description, reference is made to a first and second end of the blade, to a first and second end of the window, to a first and second drive motor, to a first and second rail, to a first and second runner, to a first and second associated coupling mechanism, to a first and second blade, and to a first and second side of the window. This is merely a form of indexing in order to differentiate and name elements which are similar but not identical. This indexing does not imply that one element takes priority over another, and such naming conventions can be readily interchanged without departing from the scope of the present description. Neither does this indexing imply an order with respect to time, for example when assessing the layout of the various elements that make up the wiping system, or else when assessing the operation of the wiping system.

In the following description, what is meant by "rectangular or trapezoidal shape of the window" is the two-dimensional shape of this window, which means to say its shape without taking its radius of curvature into consideration.

Moreover, what is meant in the following description by "runner" is a mobile object which slides along a rail.

In the following description, the various elements are introduced in general terms first of all, and then may be used specifically later, notably specifying how they are positioned. The specific terms set out the various features of the elements introduced in general terms prior to their specific use.

Figure 1:
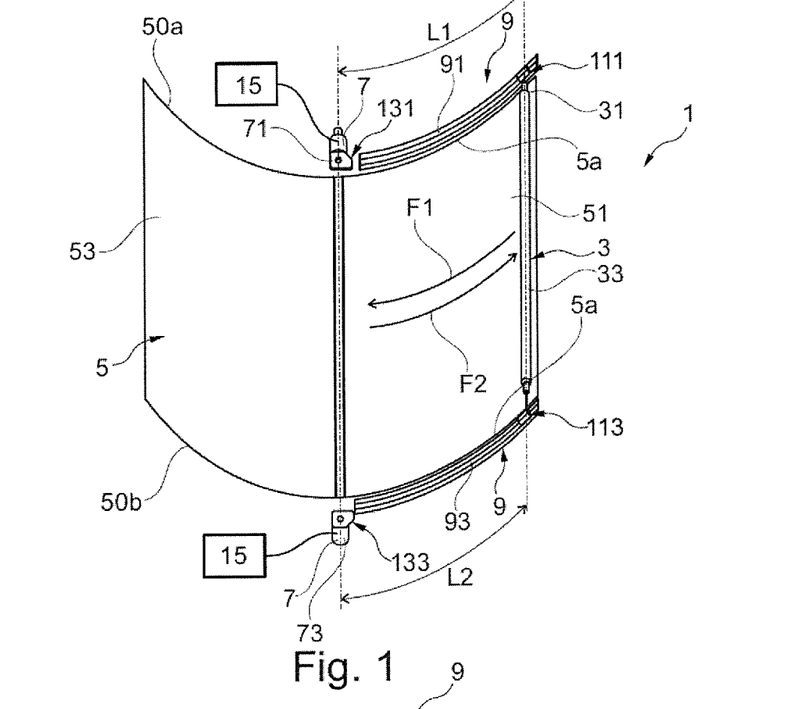
FIG. 1 is a schematic high-angle perspective view of a wiping system.

Reference is made to FIG. 1 which depicts a wiping system 1, notably for a motor vehicle. In order not to overload the figure, only part of the wiping system 1 is depicted. The wiping system 1 comprises at least one blade 3 and at least one drive motor 7.

The blade 3 (best visible in FIG. 4) is configured to move in linear translation over a motor vehicle window 5 that is to be wiped, as illustrated by the arrows F1 and F2. What is meant by linear translation, is a translational movement of the blade 3 over the window 5 parallel to the horizon. The window 5 may be of rectangular or trapezoidal overall shape, such as, for example, a front windscreen. Furthermore, in order to improve the aerodynamics of the motor vehicles and thus limit the energy consumptions of these vehicles, the window 5 has a curvature directed towards the outside of the motor vehicle interior. The at least one blade 3 has a first end 31 positioned at a first end 50a of the window 5, a second end 33 positioned at a second end 50b of the window 5 opposite to the first end 50a, and a blade rubber 34 arranged in contact with the window 5 so as to wipe same. Thus, the wiping system 1 corresponds to a linear wiping system. In general, the wiping system 1 comprises two blades 3 positioned one on each side of the window 5 forming the windscreen for example. However, the wiping system 1 may have a different number of blades 3 depending on the length of the window 5 to be wiped, for example.

The at least one drive motor 7 is configured to allow the blade 3 to be moved in translation over the window 5 that is to be wiped in a direction parallel to two opposite sides 5a of this window 5. To this end, the at least one drive motor 7 is connected to at least one control unit 15. According to the embodiment of FIG. 1, the wiping system has a first drive motor 71 arranged at the first end 50a of the window 5 and a second drive motor 73 arranged at the second end 50b of the window 5, the first 50a and second 50b ends of the window 5 corresponding to the opposite sides 5a. The first 71 and second 73 drive motors operated by the at least one control unit 15 allow the first 31 and second 33 ends of the blade 3 to be moved in a synchronized manner, thereby allowing the blade rubber 34 to be moved across the entire window 5, and notably the first 31 and second 33 ends of the blade so as to ensure correct wiping of this window 5, notably of the end zones of this window 5. According to the embodiment of FIG. 1, two control units 15 are depicted. However, the wiping system 1 can be operated by a single control unit 15.

The wiping system 1 further comprises at least two rails 9 (best visible in FIG. 2) arranged along the sides 5a of the window 5 and extending parallel to the direction of travel of the at least one blade 3 over this window 5. More specifically, the wiping system comprises a first 91 and a second 93 rail, the first rail 91 being positioned at the first end 50a of the window 5 and the second rail 93 being positioned at the second end 50b of the window 5 as depicted with reference to FIG. 1. Advantageously, the at least one first 91 and second 93 rails respectively have a curvature intended to espouse the shape of the window 5 that is to be wiped. The at least two rails 9 are intended to each house at least one runner 11 (best visible in FIGS. 3A and 3B) of the blade 3. More specifically with reference to FIG. 1, the first rail 91 is intended to house a first runner 111 and the second rail 93 is intended to house a second runner 113. This first runner 111 and second runner 113 are described in greater detail later. Moreover, the first drive motor 71 is arranged at the first 91 and the second drive motor 73 is arranged at the second rail 93.

The first 111 and second 113 runners are respectively connected to the first 31 and second 33 ends of the blade 3. The wiping system 1 further comprises an associated coupling mechanism 13 (best visible in FIGS. 5 to 7) allowing the runners 11 to move. More specifically with reference to FIG. 1, the wiping system 1 comprises a first associated coupling mechanism 131 connected to the first drive motor 71 so as to move the first runner 111 in the first rail 91 and a second associated coupling mechanism 133 connected to the second drive motor 73 so as to move the second runner 113 in the second rail 93.

The presence of the first runner 111 and of the second runner 113 which are housed in the first rail 91 and the second rail 93 and respectively connected to the first 31 and second 33 ends of the blade 3 allow these first 31 and second 33 ends of the blade 3 to be kept in contact with the window 5. That in particular makes it possible to ensure effective wiping of the entirety of the window 5 whatever its curvature.

With reference to FIG. 1, the first end 50a of the window 5 has a length L1 and the second end 50b of the window 5 has a length L2. These lengths L1, L2 may be identical or different depending on the motor vehicle considered.

In the case in which the lengths L1, L2 of the window 5 are identical, the at least one first 71 and second 73 drive motors are configured to move the first 111 and second 113 runners respectively at the same speed. This is because in such a configuration, the travel of the first 111 and second 113 runners is identical. Thus, in order to limit torsion loadings on the blade 3 as it moves translationally across the window 5, these first 111 and second 113 runners are moved by the first 71 and second 73 drive motors at the same speed. For that, the control unit 15 commands the operation of the motors in such a way that the first 111 and second 113 runners move at the same speed in the first 91 and second 93 rails.

In the case in which the lengths L1, L2 of the window 5 are different, the at least first 71 and second 73 drive motors are configured to move the first 111 and second 113 runners at different speeds in order to mitigate the effects of differences in length of the two opposite sides 5a of the window 5 that is to be wiped. Specifically, in order to ensure that the blade rubber 34 is moved across the entirety of the window 5 and in order to limit the torsion loadings on blade 3 as its moves, the first 31 and second 33 ends of the blade 3 need to be moved at different speeds in order notably to mitigate the effects of these differences in length. For that, the control unit 15 commands the operation of the drive motors 7 in such a way that the first 111 and the second 113 runners move at different speeds so that they always remain facing one another so as to limit the torsion loading that might be applied to the blade 3 and also to ensure that the blade rubber 34 is moved across the entirety of the window 5.

According to the particular embodiment of FIG. 1, the at least first 71 and second 73 drive motors are configured to move the blade 3 at a speed of at most 2 m/s over the surface of the window 5 that is to be wiped. Advantageously, moving the blade 3 at such a speed over the window 5 makes it possible to limit the heating and therefore the wearing of the material of which the blade 3 is made, this material potentially being rubber for example.

Figure 2:
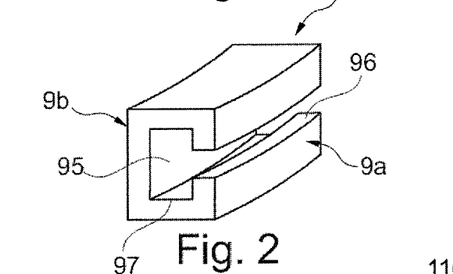
FIG. 2 is a schematic partial view of a rail of the wiping system of FIG. 1.

Reference is made to FIG. 2 which depicts the rail 9 in greater detail. The following description applies to the first rail 91 or to the second rail 93 of FIG. 1 equally. The rail 9 according to this particular embodiment can be likened to a profile element, for example made of metal, serving to guide the translational movement of the blade 3. The rail 9 has a front face 9a intended to be positioned facing towards the outside of the motor vehicle and a rear face 9b, opposite to the front face 9a, intended to be at partially in contact with the bodywork of the motor vehicle so as to allow the rail 9 to be installed and fixed to the motor vehicle. The rail 9 can be fixed to the motor vehicle by any means known to those skilled in the art, such as, for example, screw-fastening, welding or even bonding.

The rail 9 has an interior surface 95 intended to accommodate the at least one runner 11, a central opening 96 arranged at the front face 9a and extending along the entire length of the rail 9 allowing part of the runner 11 collaborating with the blade 3 to pass, and end openings 97 arranged at each end of the rail 9 in order to allow the passage of part of the associated coupling mechanism 13 so as to allow the runner 11 to move along inside the rail 9.

To facilitate movement of the runner 11 inside the rail 9, the interior surface 95 is made from a material that has a coefficient of friction of less than 0.25. According to the particular embodiment of FIG. 2, the material used for the interior surface 95 of the rail 9 is chosen from copper, tin, bronze, polytetrafluoroethylene, a polyamide, graphite, nylon, an acetal, or a mixture of these compounds. The use of such a material for the interior surface 95 of the rail 9 makes it possible to limit the wearing of the runner 11 as it moves along inside the rail 9.

According to an alternative form not depicted here, the interior surface 95 of the rail 9 is configured to allow the runner 11 to move on a cushion of air.

Moreover, in order to prevent the wearing of the associated coupling mechanism 13, the end openings 97 of the rail 9 may have a shape configured to limit the impairment of the associated coupling mechanism 13, such as, for example, a rounded or chamfered shape.

Figure 4:
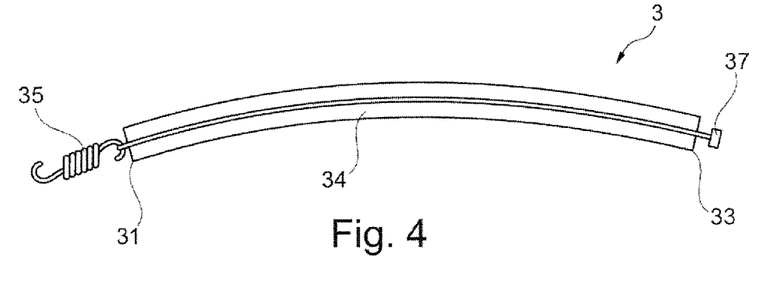
FIG. 4 is a schematic perspective view of a blade of the wiping system of FIG. 1.

Reference is made to FIG. 4 which depicts the blade 3 according to one particular embodiment. According to this particular embodiment, the first end 31 of the blade 3 has a spring 35 intended to provide the connection between the first end 31 of the blade 3 and the first runner 111 arranged in the at least one first rail 91 and the second end 33 of the blade 3 has a specific shape of attachment 37, notably spherical or parallelepipedal, intended to collaborate with the second runner 113 arranged in the at least one second rail 93. The presence of the spring 35 at the first end 31 of the blade 3 makes it possible to compensate the variations in distance between the first 91 and second 93 rails through the compression or the stretching of this spring 35. Specifically, this distance may vary according to the location at which the blade 3 is positioned on the window 5. In addition, the use of the spring 35 allows the blade rubber 34 to be pressed firmly against the window 5 by the tension applied by the spring to the blade rubber 34.

Moreover, according to the particular embodiment of FIG. 4, the blade 3 exhibits only the blade rubber 34, which means that the blade rubber 34 has enough flexibility to espouse the shape of the window 5 between its first 50a and second 50b ends whatever the curvature of this window 5.

According to an alternative form which is not depicted here, the second end 33 of the blade 3 may also have a spring 35 intended to provide the connection between the second end 33 of the blade 3 and the second runner 113 arranged in the at least one second rail 93. According to this alternative form, the first 31 and second 33 ends of the blade 3 therefore each have a spring 35.

Optionally according to an alternative form that is not depicted, the blade 3 may have a wear or aging indicator that allows the user of the motor vehicle to be alerted to the need to replace the blade 3.

Figure 3A:
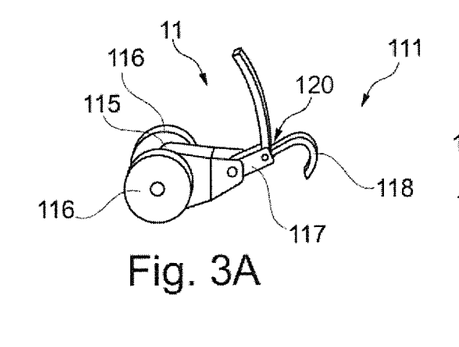
FIG. 3A is a schematic perspective view of a first runner intended to be housed in the rail of FIG. 2.
Figure 3B:
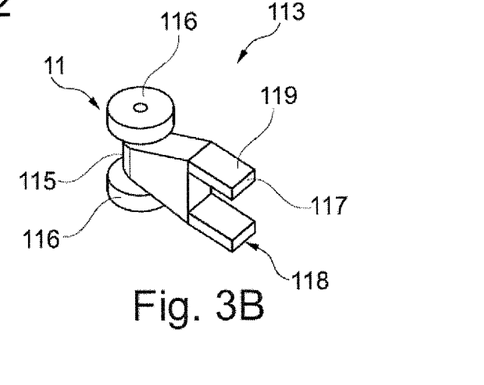
FIG. 3B is a schematic perspective view of a second runner intended to be housed in the rail of FIG. 2.

Reference is made to FIGS. 3A and 3B which depict the first 111 (FIG. 3A) and second 113 (FIG. 3B) runners intended to collaborate with the blade 3 according to the particular embodiment of FIG. 4. The first 111 and second 113 runners have a first end 115 intended to be housed in the rail 9 and a second end 117 exhibiting a clip 118 intended to allow the said runner 11 to collaborate with the first 31 or the second 33 end of the blade 3.

According to the embodiment of FIG. 3A, the clip 118 of the second end 117 of the first runner 111 has a catch 120 intended to collaborate with a free end of the spring 35 of the first end 31 of the blade 3 so as to ensure collaboration between the first runner 111 and the first end 31 of the blade 3. Advantageously the use of this catch 120 allows the first end 31 of the blade 3 to be removed easily so that the blade 3 can be replaced quickly when necessary.

According to the particular embodiment of FIG. 3B, the clip 118 of the second runner 113 exhibits a shape 119 that complements the specific shape of attachment 37 borne by the second end 33 of the blade 3 so as to allow the second end 117 of the second runner 113 to collaborate with the second end 33 of the blade 3.

Moreover, according to the particular embodiment of FIGS. 3A and 3B, the first end 115 of the runner 11 has wheels 116 to allow it to move along inside the rail 9. According to an alternative form which has not been depicted here, when the runner 11 is intended to be moved along inside the rail 9 on a cushion of air, the presence of these wheels 116 may prove unnecessary.

Figure 5:
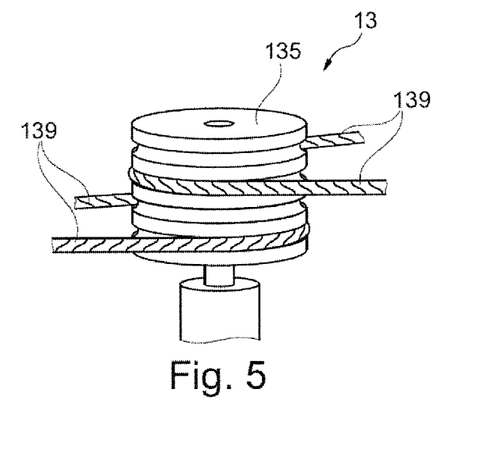
FIG. 5 is a schematic perspective view of a four-groove pulley that makes up an associated coupling mechanism of the wiping system.
Figure 6:
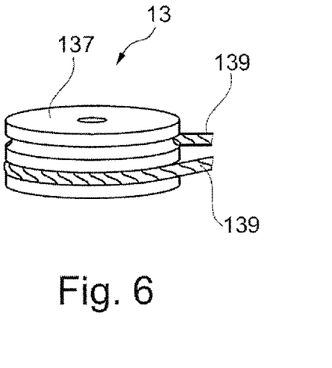
FIG. 6 is a schematic perspective view of a two-groove pulley that makes up the associated coupling mechanism of the wiping system.
Figure 7:
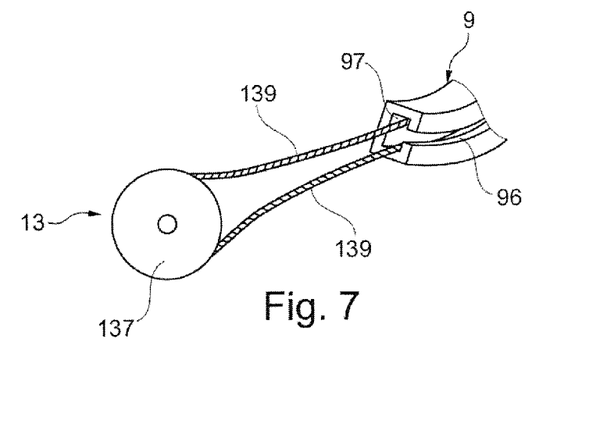
FIG. 7 is a schematic perspective view of the two-groove pulley of FIG. 6 arranged at one end of the rail of FIG. 2.

Reference is made to FIGS. 5 to 7 which depict the associated coupling mechanism 13 that allows the runner 11 to move along inside the rail 9. The first 131 and second 133 associated coupling mechanisms are chosen from a belt-and-pulley system, a cable-and-pulley system, or else a rack-and-pulley system. According to the particular embodiment depicted here, the associated coupling mechanism 13 comprises a system comprising a cable 139 and pulleys 135, 137. Furthermore, with reference to FIG. 7, the end opening 97 of the rail 9 has rounded edges so as to limit the fatiguing of the cable 139. Such a shape for the edges of the end opening 97 may also be used in the case of an associated coupling mechanism 13 employing a belt-and-pulley system. According to an alternative form which has not been depicted, the end opening 97 may exhibit a funnel shape convergent towards the inside of the rail 9.

Figure 8A:
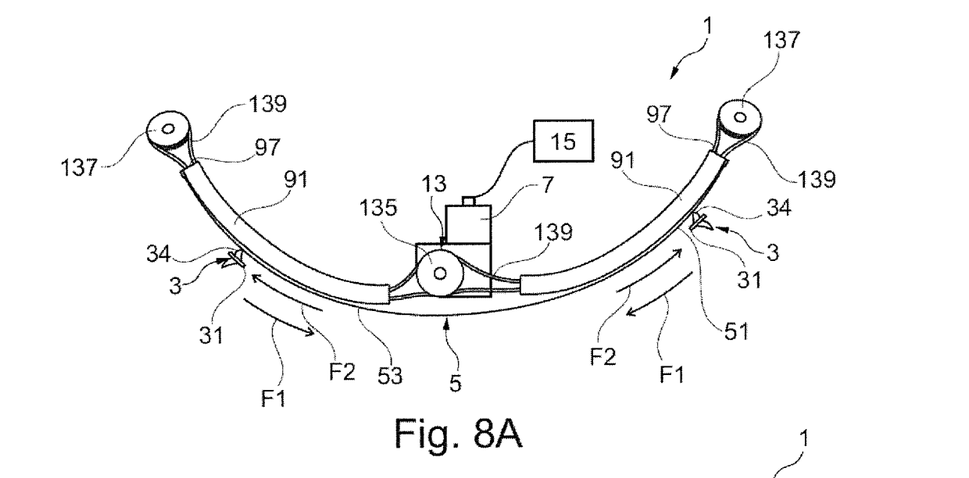
FIG. 8A is a schematic plan view of the wiping system according to one particular embodiment.
Figure 8B:
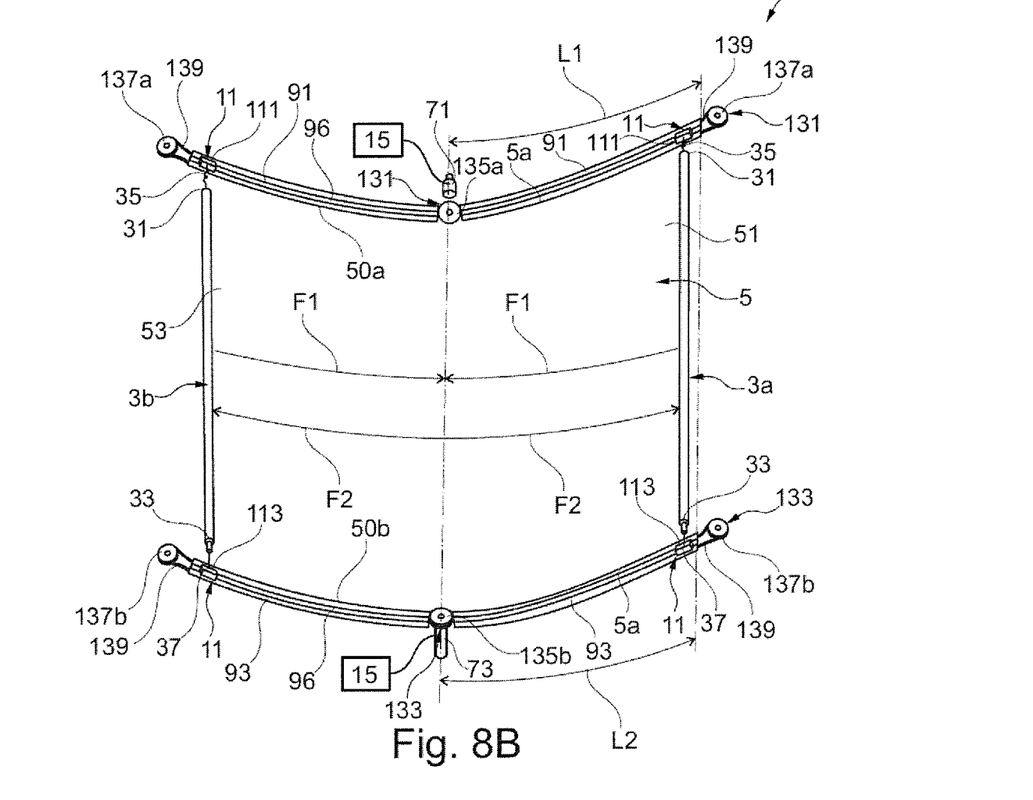
FIG. 8B is a schematic front view of the wiping system according to the particular embodiment of FIG. 8A.

Reference is made to FIGS. 8A and 8B which depict the wiping system 1 according to one particular embodiment. According to this particular embodiment, the wiping system 1 is installed on a window 5, such as the windscreen of a lorry for example, that has a pronounced curvature (visible in FIG. 8A).

According to the particular embodiment depicted here, the window 5 comprises a first side 51 and a second side 53. In order to ensure correct wiping of this window 5, the wiping system 1 has a first blade 3a positioned on the first side 51 of the window 5 and a second blade 3b positioned on the second side 53 of the window 5. Specifically, depending on the side, and particularly the length, of the window 5, it may be necessary to resort to two blades or even more in order to ensure effective removal of the water which may be deposited on the window 5 during an episode of rain for example.

The first 3a and second 3b blades are intended to be moved respectively over the first 51 and second 53 sides of the window 5 in the directions of the arrows F1 and F2, namely in a linear translational movement. According to this particular embodiment, when the first 3a and second 3b blades move in the direction of the arrow F1, they move in such a way as to move towards one another. Moreover, when they move in the direction of the arrow F2, they move in such a way as to move away from each other.

The wiping system 1 comprises the first 71 and the second 73 drive motors positioned respectively at the centre of the first 91 and second 93 rails. The first 71 and second 73 drive motors are operated by one or more control units 15. More particularly according to this particular embodiment, the first 71 and second 73 drive motors are operated respectively by a control unit 15. Moreover, the first side 51 and the second side 53 of the window 5 are opposite one another with respect to the first 71 and second 73 drive motors.

The wiping system also comprises the first 131 and second 133 associated coupling mechanisms. The first 131 and second 133 associated coupling mechanisms comprise a first 135a and a second 135b four-groove pulley, two first 137a and two second 137b two-groove pulleys, and four cables 139 respectively connecting the first two-groove pulleys 137a to the first four-groove pulley 135a, and the second two-groove pulleys 137b to the second four-groove pulley 135b.

The first 135a and second 135b four-groove pulleys are positioned at the centre of the first 91 and second 93 rails and are rotationally moved by the first 71 and second 73 drive motors respectively. According to this particular embodiment, the first rail 91 and the second rail 93 may have an opening to allow the passage of the first 135a and second 135b four-groove pulleys. According to another embodiment which has not been depicted here, the first 135a and second 135b four-groove pulleys may be arranged inside the first 91 and second 93 rails.

On the other hand, the two first 137a and the two second 137b two-groove pulleys are positioned respectively at the ends of the first 91 and second 93 rails. According to the particular embodiment depicted here, the first 137a and second 137b two-groove pulleys are arranged outside the first 91 and second 93 rails. According to another embodiment not depicted here, these first 137a and second 137b two-groove pulleys may be positioned inside the first 91 and second 93 rails.

Moreover, the cables 139 each support at least one runner 11 and are configured to allow this at least one runner 11 to be moved between one of the two-groove pulleys 137a, 137b and one of the four-groove pulleys 135 which are connected by the cable 139 so as to allow the first 3a or the second 3b blade to be moved over the window 5 that is to be wiped.

According to the particular embodiment described here, the cables 139 are stretched between the four-groove pulleys 135 and the two-groove pulleys 137 in such a way that there is no lag between the start of rotation of the four-groove pulley 135 and the start of rotation of the two-groove pulley 137. Specifically, according to this embodiment, the two-groove pulleys 137 are rotationally moved by the rotation of the four-groove pulleys 135, the movement of which is transferred via the cable 139 in such a way as to allow the runner 11 to be moved between the four-groove pulleys 135 and the two-groove pulleys 137 in the direction of the arrows F1 or F2.

Advantageously, the rotation of the four-groove pulleys 135 positioned at the centre of the first 91 and second 93 rails is controlled by the control unit 15 thus allowing the movement of the first 3a and second 3b blades to be coordinated in such a way that the first 3a and second 3b blades move in a synchronized manner in the direction of the arrows F1 or F2.

According to another embodiment not depicted here, the first 71 and second 73 drive motors may be positioned at an end respectively of the first 91 and second 93 rails. In this other embodiment, one of the first two-groove pulleys 137a and one of the second two-groove pulleys 137b are rotationally moved by the first 71 and second 73 drive motors in such a way as to allow the runners 11 to move along inside the first 91 and second 93 rails, thus allowing the first 3a and second 3b blades to move over the window that is to be wiped. According to this other embodiment, the first 71 and second 73 drive motors may be controlled by a single control unit 15 or each drive motor 7 may be controlled by its own control unit 15.

According to another alternative form which has not been depicted, the wiping system 1 may have four drive motors 7 arranged in such a way as to each drive the rotation of one two-groove pulley 137. Thus, the four drive motors 7 are arranged each at one end of the first 91 and second 93 rails. Moreover, according to this alternative form, the drive motors 7 may be controlled by a single control unit 15. Alternatively, the wiping system may comprise two control units 15 configured to respectively operate two drive motors 7. In another alternative, the wiping system 1 may comprise four control units 15, each control unit 15 operating one drive motor 7.

The various embodiments described hereinabove are non-limiting examples given by way of illustration. Specifically, it is entirely possible for a person skilled in the art to employ a material other than rubber to form the blade 3 without departing from the scope of the present invention. In addition, depending on the material used to form the blade 3, the speed at which this blade 3 is moved over the window 5 may be altered without departing from the scope of the present invention. Furthermore, the person skilled in the art will be able, without departing from the scope of the present invention, to use for fixing the rail 9 to the motor vehicle any other type of fixing from those described hereinabove. Also, the person skilled in the art will be able, without departing from the scope of the present invention, to use to form the interior surface 95 of the rail any material having a coefficient of friction of less than 0.25 that is other than the materials described hereinabove. Furthermore, the person skilled in the art will be able, without departing from the scope of the present invention, to alter the structure of the specific shape 37 borne by the second end 33 of blade 3. Finally, the person skilled in the art will also be able, without departing from the scope of the present invention, to use types of associated coupling mechanisms 13 which are other than those described hereinabove.

Thus, obtaining a linear wiping system 1 that allows correct wiping of the window 5 is possible by virtue of the wiping system 1 described hereinabove. Furthermore, the curvature of the window 5 does not influence the quality of the wiping because the first 91 and second 93 rails espouse the shape of the window 5 and, therefore, the various angles of attack of this window 5. Furthermore, the first 71 and second 73 drive motors are able to compensate for any potential variation in the length of the sides 5a of the window 5 by altering the speed of travel of the first 111 or of the second 113 runner.

The invention claimed is:
1. A wiping system for a motor vehicle, comprising:
at least one blade configured to move in linear translation over a window and in a direction parallel to two opposite sides of the window, the at least one blade having a first end and a second end;
at least a first rail and a second rail which are arranged at the sides of the window, the at least first rail and second rail respectively having a curvature to espouse a curved shape of the window, and being configured to house a first runner and a second runner which are respectively connected to the first and to the second ends of the blade; and
at least one first drive motor and one second drive motor arranged respectively at the first rail and at the second rail respectively to drive the first runner and the second runner via a first associated coupling mechanism and second associated coupling mechanism,
the at least first drive motor and second drive motor being operated by a control unit configured to allow the movements of the first runner and of the second runner to be synchronized,
wherein the at least one blade wipes across the curved shape of the window based on the synchronized move- ments of the first runner along the curvature of the first rail and the second runner along the curvature of the second rail, wherein the first rail and the second rail each have at least one end opening, said end openings having a rounded or chamfered shape to complement a shape of the first associated coupling mechanism and the second associated coupling mechanism, and wherein the rounded or chamfered shape of said end openings is configured to limit an impairment of the first associated coupling mechanism and the second associated coupling mechanism.

2. The wiping system according to claim 1, wherein the first end of the blade has a spring to provide the connection between the first end of the blade and the first runner arranged in the at least one first rail.

3. The wiping system according to claim 1, wherein the second end of the blade has a specific shape of attachment configured to collaborate with the second runner arranged in the at least one second rail.

4. The wiping system according to claim 1, wherein the first runner and the second runner have a first end housed in the rail and a second end exhibiting a clip intended to allow the said runner to collaborate with the first or the second end of the blade.

5. The wiping system according to claim 1, wherein the first drive motor and the second drive motor are configured to move the first runner and the second runner respectively at the same speed.

6. The wiping system according to claim 1, wherein the first drive motor and the second drive motor are configured to move the first runner and the second runner at different speeds so as to mitigate the effects of differences in length of the two opposite sides of the window.

7. The wiping system according to claim 1, wherein the first associated coupling mechanism and the second associated coupling mechanism comprise at least one selected from a group consisting of a belt-and-pulley system and a cable-and-pulley system.

8. The wiping system for wiping a window according to claim 1, further comprising:
  the first drive motor and the second drive motor which are arranged respectively at a centre of the first rail and of the second rail;
  a first blade and a second blade, the first blade being positioned on a first side of the window and the second blade being positioned on a second side of the window, opposite to the first side with respect to the first drive motor and second drive motor,
  the first associated coupling mechanism and the second associated coupling mechanism, comprising:
    a first four-groove pulley and a second four-groove pulley, positioned at the centre of the first rail and second rail and moved in terms of rotation by the first drive motor and second drive motor respectively,
    two first two-groove pulleys and two second two-groove pulleys positioned respectively at the ends of the first rail and second rail, and
    four cables respectively connecting the first two-groove pulleys to the first four-groove pulley and the second two-groove pulleys to the second four-groove pulley, the said cables each supporting at least one runner and being configured to allow this at least one runner to be moved between the two-groove pulley and the four-groove pulley which are connected via the said cable so as to allow the first or the second blade to be moved over the window that is to be wiped.

* * * * *